US007052712B2

(12) United States Patent  
Huber et al.

(10) Patent No.: US 7,052,712 B2
(45) Date of Patent: *May 30, 2006

(54) ANIMAL FEEDS INCLUDING ACTIVES AND METHODS OF PREPARING SAME

(75) Inventors: Gordon R. Huber, Sabetha, KS (US); David R. Jones, Palm Beach, FL (US); John C. Kuenzi, Bern, KS (US); Kevin D. Kuenzi, Perry, KS (US); Francisco A. Cabrera, Overland Park, KS (US)

(73) Assignee: Rubicon Scientific LLC, Sabetha, KS (US)

( * ) Notice: Subject to any disclaimer, the term of this patent is extended or adjusted under 35 U.S.C. 154(b) by 99 days.

This patent is subject to a terminal disclaimer.

(21) Appl. No.: 09/971,519

(22) Filed: Oct. 5, 2001

(65) Prior Publication Data

US 2003/0097992 A1 May 29, 2003

(51) Int. Cl.
*A61K 9/14* (2006.01)

(52) U.S. Cl. .................. 424/442; 424/489; 424/499
(58) Field of Classification Search ................ 424/400, 424/438, 439, 441, 442, 489, 499; 426/1, 426/2, 276, 531, 805, 807, 69
See application file for complete search history.

(56) References Cited

U.S. PATENT DOCUMENTS

| | | | |
|---|---|---|---|
| 721,633 A | 2/1903 | Eaton | |
| 1,204,551 A | 11/1916 | Edgerton | |
| 1,244,141 A | 10/1917 | Sterling | |
| 2,742,394 A | 4/1956 | Davis et al. | |
| 2,868,692 A | 1/1959 | Bach et al. | |
| 2,893,914 A | 7/1959 | McCowen et al. | |
| 3,005,753 A | 10/1961 | Vierling | |
| 3,380,832 A | 4/1968 | Bone | |
| 3,553,313 A | 1/1971 | Tort | |
| 3,557,284 A | 1/1971 | Wilhelm et al. | |
| 3,617,299 A | 11/1971 | Mattoon et al. | |
| 3,686,392 A | 8/1972 | Hamada et al. | |
| 3,696,189 A | 10/1972 | Snyder | |
| 3,765,902 A | 10/1973 | Charter | |
| 3,829,564 A | 8/1974 | Merry et al. | |
| 3,857,968 A | 12/1974 | Haas et al. | |
| 3,883,672 A | 5/1975 | Bone et al. | |
| 3,908,025 A | 9/1975 | Miller et al. | |
| 4,027,043 A * | 5/1977 | Schroeder et al. | 426/69 |
| 4,046,753 A | 9/1977 | Fisher et al. | |
| 4,094,976 A | 6/1978 | Dybas et al. | |
| 4,118,512 A | 10/1978 | Eichelburg | |
| 4,265,913 A | 5/1981 | Eichelburg | |
| 4,348,379 A | 9/1982 | Kowalsky et al. | |
| 4,643,908 A * | 2/1987 | Sawhill | 426/630 |
| 4,713,245 A | 12/1987 | Ando et al. | |
| 4,729,896 A * | 3/1988 | Sawhill | 426/2 |
| 4,808,412 A | 2/1989 | Smith et al. | |
| 4,842,862 A | 6/1989 | Jacobs et al. | |
| 4,857,333 A | 8/1989 | Harold | |
| 4,861,586 A | 8/1989 | Schneider et al. | |
| 4,869,907 A | 9/1989 | Sasagawa | |
| 4,880,632 A | 11/1989 | Lipham et al. | |
| 4,948,589 A | 8/1990 | Iijima et al. | |
| 4,960,589 A | 10/1990 | Sasagawa | |
| 4,975,270 A | 12/1990 | Kehoe | |
| 4,994,496 A | 2/1991 | Repaskey et al. | |
| 4,996,055 A | 2/1991 | Kurasawa | |
| 5,000,940 A | 3/1991 | Staples et al. | |
| 5,000,973 A | 3/1991 | Scaglione et al. | |
| 5,006,341 A | 4/1991 | Davis et al. | |
| 5,015,485 A | 5/1991 | Scaglione et al. | |
| 5,041,452 A | 8/1991 | White | |
| 5,089,271 A | 2/1992 | Imamgst | |
| 5,094,870 A | 3/1992 | Scaglione et al. | |
| 5,104,662 A | 4/1992 | Kalsta et al. | |
| 5,152,986 A | 10/1992 | Lange et al. | |
| 5,169,634 A | 12/1992 | Ellingsen et al. | |
| 5,206,025 A | 4/1993 | Courteille et al. | |
| 5,208,034 A | 5/1993 | Herting et al. | |
| 5,281,584 A | 1/1994 | Tobey | |
| 5,314,692 A | 5/1994 | Haarasilta et al. | |
| 5,316,769 A | 5/1994 | Nakano et al. | |
| 5,316,770 A | 5/1994 | Edwards, Jr. | |
| 5,320,849 A | 6/1994 | Hagiwara et al. | |
| 5,378,471 A | 1/1995 | Smith | |
| 5,393,333 A | 2/1995 | Trouve | |
| 5,405,836 A | 4/1995 | Richar et al. | |
| 5,407,661 A | 4/1995 | Simone et al. | |
| 5,439,924 A | 8/1995 | Miller | |
| 5,516,525 A | 5/1996 | Edwards, Jr. | |
| 5,540,932 A | 7/1996 | Lanter et al. | |
| 5,578,585 A | 11/1996 | Matous et al. | |
| 5,589,187 A | 12/1996 | Wentworth et al. | |

(Continued)

FOREIGN PATENT DOCUMENTS

WO   WO0072698   12/2000

OTHER PUBLICATIONS

Lewis, B P et al; Veterinary Drug Index; 1982; p. 25.

(Continued)

*Primary Examiner*—Thurman K. Page
*Assistant Examiner*—Sharon Howard
(74) *Attorney, Agent, or Firm*—Hovey Williams LLP

(57) ABSTRACT

Improved extrusion-processed daily ration animal feeds are provided which include minor amounts of actives to ensure that an animal consuming the feed receives quantities of the actives sufficient to establish and maintain substantially constant concentrations of the actives in the animal's bloodstream. The feeds may be produced by extrusion with addition of minor quantities of one or more actives so as to uniformly distribute the actives throughout the extruded product.

17 Claims, No Drawings

U.S. PATENT DOCUMENTS

| | | |
|---|---|---|
| 5,603,945 A | 2/1997 | Iobel et al. |
| 5,676,966 A | 10/1997 | Kitamura et al. |
| 5,686,111 A | 11/1997 | Jalbert |
| 5,695,794 A | 12/1997 | Stark et al. |
| 5,720,971 A | 2/1998 | Beauchemin et al. |
| 5,725,865 A | 3/1998 | Mane et al. |
| 5,725,873 A | 3/1998 | Cook et al. |
| 5,728,398 A | 3/1998 | Onishi et al. |
| 5,738,866 A | 4/1998 | Lanter et al. |
| 5,747,063 A | 5/1998 | Languet et al. |
| 5,750,135 A | 5/1998 | Schleicher et al. |
| 5,753,223 A | 5/1998 | Shibahara et al. |
| 5,756,088 A | 5/1998 | Matsuura et al. |
| 5,756,719 A | 5/1998 | Chaundy et al. |
| 5,767,107 A | 6/1998 | Chaundy et al. |
| 5,770,217 A | 6/1998 | Kutilec, III et al. |
| 5,780,046 A | 7/1998 | Humber et al. |
| 5,792,470 A | 8/1998 | Baumgardener, Sr. |
| 5,795,585 A | 8/1998 | Ikeda et al. |
| 5,840,860 A | 11/1998 | Annison et al. |
| 5,843,922 A | 12/1998 | Whistler et al. |
| 5,853,757 A | 12/1998 | Durand et al. |
| 5,894,029 A | 4/1999 | Brown et al. |
| 5,904,928 A | 5/1999 | Cyr et al. |
| 5,908,634 A | 6/1999 | Kemp et al. |
| 5,919,451 A | 7/1999 | Cook et al. |
| 5,919,499 A | 7/1999 | Lawley |
| 5,922,692 A | 7/1999 | Marino |
| 5,948,431 A | 9/1999 | Lavery |
| 5,958,977 A | 9/1999 | Ikeda et al. |
| 5,962,043 A | 10/1999 | Jones et al. |
| 5,989,600 A | 11/1999 | Nielsen et al. |
| 6,001,384 A | 12/1999 | Jeannin |
| 6,004,576 A | 12/1999 | Weaver et al. |
| 6,004,585 A | 12/1999 | Grofmeyer et al. |
| 6,017,530 A | 1/2000 | Beudeker et al. |
| 6,022,555 A | 2/2000 | DeLuca et al. |
| 6,030,637 A | 2/2000 | Whitehead |
| 6,045,819 A | 4/2000 | Takebe |
| 6,048,543 A | 4/2000 | Schneider et al. |
| 6,077,525 A | 6/2000 | Vanderhock |
| 6,080,419 A | 6/2000 | Stookey |
| 6,110,511 A | 8/2000 | Rollins et al. |
| 6,117,477 A | 9/2000 | Paluch |

OTHER PUBLICATIONS

Merck & Co; The Merck Veterinary Manual; 1979; p. 1559.

Kirk, Robert W. et al; Handbook of Veterinary Procedures and Emergency Treatment; 1975; p. 553.

Lewis, Lon D. et al; Small Animal Clinical Nutrition; 1984; pp. 13-5; 13-8; 13-9; 13-12; A2-9, A2-11-A2-14.

Hills; Science Diet Dog Food Maximum Stress Diet Medicated Label; 1985; Stock No. 4180.

Morris, Mark L PhD; Nutritional Management in Gastrointestinal Disorders; Veterinary Clinics of North America—vol. 1, No. 1; 1972; pp. 65; 74-77.

Morris, Mark L. et al; Dietary Management of Chronic Renal Failure in Dogs; Canine Practice vol. 5, No. 1; Feb. 1978 p. 48.

Edited by Fox, P.F.; Developments in Dairy Chemistry-4; Functional Milk Proteins; 1989; Contents of vols. 2 and 3;pp. v; 230-231; 242-243.

Morris, Mark DVM; Small Animal Clinical Nutrition; 1984; pp. A2-12 thru 14; A3-1.

* cited by examiner

ANIMAL FEEDS INCLUDING ACTIVES AND METHODS OF PREPARING SAME

BACKGROUND OF THE INVENTION

1. Field of the Invention

The present invention is broadly concerned with improved daily ration feed products for animals including minor amounts of an active such as a pharmaceutical drug. More particularly, the invention is concerned with such feed products, and methods of preparing and using the products, wherein the feeds contain a sufficient quantity of an active so that when the animals consume the feeds, therapeutically effective amounts of the active are established and maintained in the bloodstreams of the animals. In this way, conventional dosing regimes are eliminated, and the animals receive proper quantities of active as a part of their normal daily diets.

2. Description of the Prior Art

In recent years there has been a significant increase in animal research directed to determining proper nutritional standards and also effective drug treatments for animals. This is true not only in connection with domestic household pets such as dogs, cats, birds, and exotics, but also in regard to economically significant animals such as farm animals (e.g., horses, sheep and cattle) and zoo animals of all types.

Insofar as drug or active treatment of animals is concerned, it is generally required that these agents be administered from time to time by oral administration or injection, so that therapeutic amounts of the actives or drugs can be maintained in the bloodstreams of the animals either continuously or at least during a prescribed treatment period. Periodic dosing presents a number of difficulties. For example, the animal's caretaker may simply forget to administer a given drug or active at the required time. This can have the effect of disrupting a treatment protocol and even causing harm to the animal. For instance, dogs are conventionally treated with heartworm preventative drugs such as ivermectin on a monthly basis. If the dog's owner forgets to timely administer the drug, the dog is susceptible to heartworm infection. Another problem associated with periodic dosing of animals stems from the fact that the animals may be very reluctant to cooperate, especially if the drug or active is to be orally administered. Any cat owner can testify to the difficulty of persuading a domestic cat to consume a drug product.

Attempts have been made in the past to provide daily ration products which include therapeutic drugs. For example, Hills Pet Food Products made and sold a Science Diet product referred to as "Maximum Stress Diet" which included small amounts of styrylpyridinium chloride and diethylcarbamazine in a canned dog food containing substantial quantities of animal fat which required refrigeration. However, the Maximum Stress Diet is no longer available, and was not optimum in that it required refrigeration and special handling. This is to be contrasted with conventional extruded feed products designed to be stored over extended periods at ambient temperature without significant loss of nutrients.

U.S. Pat. No. 6,190,591 describes a single-extruder process for the production of controlled release particles which may be tableted. Various encapsulants including pharmaceuticals, nutraceuticals, nutritional compounds, biologically active components, flavorants, fragrances, detergents and surface-active compositions are described, at relatively large quantities in the particles of at least 1% and preferably from about 3–50%. Hence, the '591 patent is not concerned with complete feeds, but rather encapsulant particles. The process described in this patent make use of an elongated extruder where water and lipid are successively injected into the barrel, followed by water evaporation from the barrel and final addition of encapsulants. Such equipment is generally not suited to the production of a daily ration feed or similar product, given the need to uniformly distribute an active in the latter type of product.

There is accordingly a need in the art for improved daily ration extrusion-processed feeds and methods of providing actives to animals in a manner which will avoid problems inherent in periodic dosing, while maintaining substantially constant therapeutic levels of actives in the bloodstreams of animals consuming the feeds on a daily basis.

SUMMARY OF THE INVENTION

The present invention overcomes the problems outlined above and provides improved daily ration feed products for animals such as cats, dogs, birds, exotics, horses, sheep, cattle, reptiles, and zoo animals and methods of preparing and using such feeds. Generally speaking, a wide variety of feed types can be improved in accordance with the invention, especially extrusion-processed feeds of either dry or semi-moist kind. When the feeds are produced by extrusion they usually contain respective quantities of protein, fat and starch, together with a relatively minor amount of one or more actives. In all cases, however, it is preferred that the potency of the active content of the feeds be maintained for at least six months at ambient temperature storage, and more preferably nine months at ambient temperature storage.

Through use of the feed products of the invention, an animal consuming the feeds on a daily basis receives a maintenance quantity of the active, so that the therapeutic effects thereof are realized. Normally, the active should be present in the extruded feeds at a level of at least about 2 μg/kg of feed product, more preferably from about 2–1500 μg/kg of feed product, and most preferably from about 5–1000 μg/kg of feed product, although specific active amounts will vary depending upon the particular active (or combination thereof) chosen. For example, in other types of products within the ambit of the invention, the active(s) may be present at a level of up to about 0.75% by weight, more preferably up to about 0.5% by weight, and still more preferably up to about 0.1% by weight.

A large number of actives can be used in the context of the invention, so long as the actives can withstand feed processing conditions and retain their potency. Among suitable actives are antibiotics, steroids, anti-inflammatory agents, endoectacides (e.g., dewormers such as heartworm-preventative drugs) and ectoparasiticides (e.g., drugs effective against fleas and ticks).

As noted, a wide variety of extruded feeds can be used in the context of the invention. For example, typical dry extruded product having a moisture content of less than about 10% by weight can be produced with added active content. Similarly, semi-moist feeds having a moisture content on the order of 15–30% by weight are also suitable. In extruded feeds of these types, it is preferred that the active content be substantially uniformly dispersed throughout the feed. Alternately, pillow-type feeds can be produced having a soft, flowable matrix center surrounded by a shell of self-sustaining feed material; in such a case, the drug content may be present only in the soft center matrix. Inmost cases, the extruded feed products of the invention should contain from about 5–15% by weight moisture (wet basis), 15–30% by weight protein, more preferably from about 18–25% by weight protein; from about 3–24% by weight fat, more preferably from about 5–20% by weight fat; and from about 5–80% by weight starch, more preferably from about 20–50% by weight starch. Generally, the extruded feeds should have a bulk density of from about 30–700 g/l, more preferably from about 140–400 g/l, and a water activity of from about 0.1–0.99, more preferably from about 0.6–0.75.

An important goal of the invention is to provide active-containing daily ration feeds which when consumed on a daily basis by animals will establish and maintain a therapeutic amount of one or more actives in the bloodstreams of the animals. In this way, the need for periodic dosing is completely avoided, yet the beneficial effects of the active remain. To this end, the feeds should have sufficient active therein so that, when an animal consumes the feed at a rate of from about 10–40 g of the feed per kg of the consuming animal's weight, the desired therapeutic amount of drug is achieved.

During extrusion processing in accordance with the invention, starting farinaceous feed ingredients are fed into the elongated barrel of an extruder including at least one elongated, axially rotatable, helically flighted screw with an endmost extrusion die. During passage through the extruder barrel, the ingredients are subjected to elevated temperature, agitation and shear in order to cook the product. In preferred forms of the invention, the starting ingredients are first preconditioned prior to passage into the extruder barrel. Generally, during preconditioning the starting mixture is subjected to a temperature of from about 20–98° C. (more preferably from about 90–97° C.) for a period of from about 15–600 seconds (more preferably from about 170–190 seconds). The purpose of preconditioning is to initially moisturize and partially cook the starting material prior to entrance thereof into the extruder barrel. Advantageously, the material leaving the preconditioner has a moisture content of from about 10–60% by weight, and more preferably from about 21–23% by weight.

In the extruder, the preconditioned starting material is subjected to conditions of elevated heat, pressure and shear. Normally, the temperature conditions in the barrel are such as to achieve a maximum temperature of from about 20–175° C., and more preferably from about 65–120° F. Normal maximum pressure conditions are from about 100–3000 psi, and more preferably from about 150–500 psi. Residence times in the extruder barrel usually range from about 3–180 seconds, and more preferably from about 20–40 seconds.

The active content of the extruded feeds can be added at a variety of locations during the process. One preferred technique is to prepare a dilute drug solution which can be pumped at a known rate into the farinaceous ingredients during processing. For example, the drug liquid may be added at the preconditioner, preferably adjacent the outlet thereof. Alternately, the drug may be injected directly into the extruder barrel during processing. Given the relatively small quantities of drug employed in the feeds, it is generally important that there be sufficient time in the process to adequately mix in the drug substantially uniformly throughout the other ingredients.

It will be appreciated that the invention is not limited to extruded feed products, and that the principles of the invention can be applied with canned/retorted or fresh refrigerated animal foods. In addition, actives can be added to high moisture products (having a moisture content of from about 30–85% by weight). The types and contents of actives described above in connection with extruded feeds are equally applicable to such canned and fresh refrigerated feeds.

DETAILED DESCRIPTION OF THE PREFERRED EMBODIMENTS

The following examples set forth presently preferred methods for the production of heartworm preventative drug-containing pet foods and related information. It is to be understood, however, that these examples are provided by way of illustration and nothing therein should be taken as a limitation upon the overall scope of the invention.

EXAMPLE 1

In this example, an ivermectin-containing dog food product was produced using a co-extrusion process. The dry farinaceous ingredients used in this example were (all percentages on a weight basis): wheat flour—14%; rice flour—15%; corn flour—32%; corn gluten meal—12%; poultry meal—8%; brewer's yeast—2%; sodium bicarbonate—0.6%; Thoxyquin—0. 1%; potassium sorbate—0.3%; and sugar—5%. The liquid co-extruded mixture contained (all percentages on a weight basis: poultry fat—81.13%; GP (Glutamine Peptide)—11.32%; cheese powder—3.77%; and poultry meal—3.77%.

The extrusion equipment included a Wenger X-85 single screw extruder with a Wenger Model 7 DDC preconditioner. The extruder barrel was made up of a series of interconnected heads. The screw configuration, dies, adaptor parts, preconditioner shafts and beater elements were all Wenger equipment.

In order to effect the desired co-extrusion, a delivery pipe having approximately a ⅜" delivery nipple was inserted into the center of the die so that the liquid portion was directed through the die with a surrounding annulus of the extruded farinaceous mixture. The liquid portion was pumped through the delivery pipe at a rate which was approximately 30% of the extrusion rate of the farinaceous mixture. At the outlet of the extruder die, the product was cut using an knife and respective samples of the cut product were manually crimped using a hand-crimping tool. In this fashion, "pillows" of the pet food were obtained, with an outer farinaceous ingredient shell and an inner flowable filling containing ivermectin.

Following this treatment, the product was dried to a moisture level of less than 10% by weight. Three samples from the dryer were subsequently frozen and another sample was placed in a plastic bag and stored at room temperature, for a period in excess of six months.

The following table sets forth the illustrative preconditioning and extrusion information.

TABLE 1

| DRY RECIPE INFORMATION | | |
|---|---|---|
| Dry Recipe Rate | kg/hr | 93 |
| Feed Screw Speed | rpm | 11 |
| PRECONDITIONING INFORMATION | | |
| Preconditioner Speed | rpm | 485 |
| Steam Flow to Preconditioner | kg/hr | 8 |
| Water Flow to Preconditioner | kg/hr | 21 |
| Preconditioner Discharge Temp. | ° C. | 66 |
| EXTRUSION INFORMATION | | |
| Extruder Shaft Speed | rpm | 516 |
| Extruder Motor Load | % | 75 |
| Control/Temperature 2nd Head | ° C. | 40 |
| Control/Temperature 3rd Head | ° C. | 51 |
| Control/Temperature 4th Head | ° C. | 39 |

TABLE 1-continued

| | | |
|---|---|---|
| Control/Temperature 5th Head | ° C. | 48 |
| Control/Temperature 7th Head | ° C. | 45 |
| FINAL PRODUCT INFORMATION | kg/m³ | 350 |
| Extruder Discharge Density | | |

The products resulting from this test were analyzed to determine the content of ivermectin in the samples. In this analysis, each feed sample was ground in a Retsch mill at low speed using a 2 mm grating screen, so that the ground material would pass through a #10 mesh screen. A total of six samples, three frozen and three stored at room temperature, were processed. In each case, three 37.5 g of a sample was placed in a 250 ml bottle and 100 ml of methanol was added. The bottle was capped, the sample was sonicated for 20 minutes and shaken for 1 hour. 40 ml of the extract was added to a centrifuge tube and centrifuged for 5 minutes at 2000 rpm. 20 ml of the supernatant solution was then passed through a alumina column. The first five ml was rejected and the remainder of the liquid through the column was collected as a purified sample. 2 ml of the purified sample was mixed with a 5 ml mixture of acetonitrile:water (1:1), and a solid phase extraction (SPE) was performed in accordance with the procedure described in Doherty et al., *Analytical Chemists International*, 81:869(4) (1998). 2 ml of the working, 1% ivermectin sample standard was also run through the SPE procedure to determine if any loss of ivermectin was taking place.

All samples from the SPE treatment were evaporated under nitrogen using an analytical evaporator with a water bath temperature of 50° C. The dried samples were reconstituted in 2 ml of HPLC mobile phase for analysis. Two samples were also prepared using 2 ml of the working standard ivermectin solution (containing 0.42 µg/ml) and were run before and after the feed samples.

The HPLC setup consisted of the following:
Gilson 712 HPLC System Controller
Gilson 305 pump, 231 sample injector, 401 dilutor and 115 UV detector
Jones Chromatography column heater set at 30° C.

| | |
|---|---|
| HPLC Analytical column | Symmetry $C_{18}$, 5µ, 4.6 × 350 mm |
| Mobile Phase | Acetonitrile/methanol/water 53/35/7 |
| Flow rate | 1 mL/minute |
| UV Detection | 245 nm |

The results of the HPLC analyses (two injections of each feed sample and two injections of the working standard solution) confirmed that the pet food samples contained very close to the expected content (0.42 µg/kg) of ivermectin. In particular, the average ivermectin content of the three frozen and the ambient-stored samples was 0.43 µg/kg. This demonstrated that storage conditions (frozen versus ambient) had little effect upon ivermectin potency, and an excellent ivermectin stability.

EXAMPLE 2

In this example, an ivermectin-containing dog food was prepared using a Wenger TX-85 twin screw extruder equipped with a Model 16 Wenger DDC preconditioner. The dry ingredients fed to the extruder included (all percentages by weight basis): wheat middlings—18%; meat and bone meal—18%; soybean meal—18%; and corn—46%. In this run, two liquid dispersions were used which contained (all percentages by weight basis): first mixture, propylene glycol—11 lbs and water—11 lbs; second mixture, propylene glycol—48.82%; water—48.82%; red No. 40 dye—1.86%; and ivermectin solution—0.50%. The amount of ivermectin used was calculated to provide a dose of approximately 1121.1 µg of ivermectin per kg of the dog food on a dry basis.

In the process, the dry ingredients were fed to the preconditioner where steam and water was added to moisturize and partially precook the mixture. This preconditioned material was then fed to the inlet of the extruder in the usual fashion. The first liquid mixture was added to the outlet end of the preconditioner for passage into the extruder barrel along with the preconditioned material, over a period of about 11 minutes. Thereafter, the colored, ivermectin-containing liquid mixture was added over a period of about 22 minutes. Finally, additional quantities of the first water/propylene glycol liquid mixture was again added, over about 11 minutes. After extrusion, the product was dried in a Wenger dryer operating at 115° C., with two drying passes of 7 and 8.9 minutes respectively, followed by a cooler pass with 4.5 minutes retention time. The dryer discharge moisture was 6.25%, wb.

Samples were collected of the colored ivermectin-containing dispersion, the raw material mixture, preconditioned material leaving the preconditioner and extruded samples.

The following table sets forth illustrative preconditioning and extrusion conditions.

TABLE 2

| | | |
|---|---|---|
| DRY RECIPE INFORMATION | | |
| Dry Recipe Moisture | % wb | 9.56 |
| Dry Recipe Density | kg/m³ | 570 |
| Dry Recipe Rate | kg/hr | 2618 |
| Feed Screw Speed | rpm | 205 |
| PRECONDITIONING INFORMATION | | |
| Preconditioner Speed | rpm | 250 |
| Steam Flow to Preconditioner | kg/hr | 224 |
| Water Flow to Preconditioner | kg/hr | 362 |
| Preconditioner Additive 1 Rate | kg/hr | 57 |
| Preconditioner Discharge Temp. | ° C. | 90 |
| EXTRUSION INFORMATION | | |
| Extruder Shaft Speed | rpm | 700 |
| Extruder Motor Load | % | 67 |
| Steam Flow to Extruder | kg/hr | 84 |
| Water Flow to Extruder | kg/hr | 112 |
| Control/Temperature 1st Head | ° C. | 50/57 |
| Control/Temperature 2nd Head | ° C. | 50/86 |
| Control/Temperature 3rd Head | ° C. | 40/52 |
| Control/Temperature 4th Head | ° C. | 40/75 |
| Head/Pressure | kPa | 900 |
| Knife Drive Speed | rpm | 905 |
| FINAL PRODUCT INFORMATION | | |
| Extruder Discharge Density | kg/m³ | 368 |
| Extruder Performance | | Stable |

The dog food from this run was fed ad libitum to an intact female mixed breed dog weighing about 10 kg. On day 7, blood was drawn from the dog four hours after eating and stored in an anti-coagulant tube with calcium EDTA in a refrigerator. Seven days later, the same dog was again fed the ivermectin-containing feed ad libitum and blood was collected four hours post-feeding. This sample was also refrigerated in the same fashion as the first sample.

The blood samples were then analyzed to determine the content of ivermectin therein, using HPLC. The procedure used was described in Dickinson, *Journal of Chromatography*, 58:250–257 (1990). In this procedure, 0.5 ml of each blood sample was purified using solid phase extraction (SPE) cartridges and dissolved in a small volume of mobile phase for injection onto the HPLC column. The method has a limit of detection of about 2 ng/ml and uses an internal standard. After preparation of the internal standard, a standard curve is constructed using ivermectin-spiked blood samples. A known 1% ivermectin sample was used as the primary standard.

The blood samples from the dog were then analyzed for ivermectin content with HPLC peak heights corrected using the internal standard. The HPLC setup consisted of the following:

Gilson 712 HPLC System Controller

Gilson 305 pump, 231 sample injector, 401 dilutor and 115 UV detector

Jones Chromatography column heater set at 56° C.

| | |
|---|---|
| HPLC Analytical column: | Coulter-Beckman UltraSphere XL $C_{18}$, 3µ, 4.6 × 70 mm |
| Mobile Phase: | Acetonitrile/methanol/water 49/33/18 |
| Flow Rate: | 1 mL/minute |
| UV Detection: | 245 nm |

The results of this study demonstrated that the dog blood samples contained ivermectin in the range of about 5–8 ng/ml.

EXAMPLE 3

In this Example a series of extrusion runs were performed to determine the consistency of metering of ivermectin into a dog food mixture during extrusion. In each case, the farinaceous mixture included the following ingredients (all percentages on a weight basis): corn—35.93%; poultry meal—28.94%; rice—22.95%; corn gluten meal—11.98%; vitamin premix—0.10%; and mineral premix—0.10%. Three ivermectin-containing liquids were prepared, containing: Recipe #1, propylene glycol—8.60 pounds; water—8.60 pounds; red #40 dye—160 grams; ivermectin solution—0.212 ml; Recipe #2, propylene glycol—8.60 pounds; water—8.60 pounds; red #40 dye—160 grams; ivermectin solution—0.433 ml; Recipe #3, propylene glycol—8.60 pounds; water—8.60 pounds; red #40 dye—160 grams; ivermectin solution—1.279 ml. In each run 8.0 kg of a respective ivermectin recipe was added to the farinaceous ingredients at the exit of the preconditioner, prior to entering the extruder barrel. The recipes were added at a rate equal to 2% of the farinaceous mixture rate. The target for the runs using Recipe #1 was 6 µg ivermectin/kg of feed; for runs using Recipe #2, 12 µg/kg; and for runs using Recipe #3, 36 µg/kg. The extruder system employed was a Wenger model TX 57 twin screw extruder with a model 2 DDC preconditioner.

The following table sets forth the preconditioning and extrusion information collected during this series of runs. In runs 101–103, Recipe #1 was used; in runs 104–106, Recipe #2 was used; and in runs 107–109, Recipe #3 was used. As the extrudates emerged from the die, they were cut using the knife assembly and dried in a Wenger multiple-pass drier. Samples were collected at 15 minutes, 30 minutes and 45 minutes from the preconditioner, extruder and drier.

TABLE 3

| | | 101 | 102 | 103 | 104 | 105 | 106 | 107 | 108 | 109 |
|---|---|---|---|---|---|---|---|---|---|---|
| DRY RECIPE INFORMATION: | | | | | | | | | | |
| Dry Recipe Density | kg/m³ | 494 | 494 | 494 | 494 | 494 | 494 | 494 | 494 | 494 |
| Dry Recipe Rate | kg/hr | 400 | 400 | 400 | 390 | 392 | 390 | 387 | 397 | 392 |
| Feed Screw Rate | rpm | 48 | 53 | 55 | 49 | 52 | 52 | 56 | 54 | 54 |
| PRECONDITIONING INFORMATION: | | | | | | | | | | |
| Preconditioner Speed | rpm | 350 | 350 | 350 | 350 | 350 | 350 | 350 | 350 | 350 |
| Steam Flow to Preconditioner | kg/hr | 36 | 35.8 | 35.9 | 36.1 | 35.9 | 35.8 | 36 | 36.1 | 35.9 |
| Water Flow to Preconditioner | kg/hr | 48 | 48.1 | 48.3 | T47.7 | 47.9 | 48.1 | 48 | 48.2 | 48.1 |
| Preconditioner Additive 1 Rate | kg/hr | 8 | 7.9 | 8.05 | 7.8 | 7.95 | 7.84 | 8.12 | 8.03 | 8.02 |
| Preconditioner Discharge Temp. | ° C. | 86 | 85 | 85 | 86 | 86 | 86 | 85 | 85 | 85 |
| Moisture Entering Extruder | % wb | 16.26 | 17.04 | 19.14 | 18.96 | 16.47 | 18.18 | 16.14 | 18.97 | 18.98 |
| EXTRUSION INFORMATION: | | | | | | | | | | |
| Extruder Shaft Speed | rpm | 426 | 427 | 425 | 427 | 426 | 426 | 426 | 426 | 425 |
| Extruder Motor Load | % | 53 | 45 | 61 | 54 | 52 | 67 | 49 | 51 | 52 |
| Steam Flow to Extruder | kg/hr | 12 | 13.1 | 709 | 8 | 7.9 | 8 | 8.1 | 8 | 8 |
| Water Flow to Extruder | kg/hr | 24 | 24 | 24.1 | 24 | 24 | 23.8 | 24 | 24 | 23.9 |
| Control/Temp. 1st Head | ° C. | 40/52 | 40/52 | 40/52 | 40/53 | 40/55 | 40/52 | 40/53 | 40/55 | 40/54 |
| Control/Temp. 2nd Head | ° C. | 60/60 | 60/60 | 60/59 | 60/60 | 60/60 | 60/59 | 60/59 | 60/59 | 60/60 |
| Control/Temp. 3rd Head | ° C. | 80/79 | 80/80 | 80/81 | 80/80 | 80/80 | 80/81 | 80/80 | 80/80 | 80/79 |
| Control/Temp. 4th Head | ° C. | 60/67 | 60/67 | 60/67 | 60/65 | 60/65 | 60/66 | 60/65 | 60/65 | 60/64 |
| Head/Pressure | kPa | 1710 | 1600 | 1980 | 1660 | 1770 | 1910 | 1960 | 1980 | 1830 |
| Knife Drive Speed | rpm | 1324 | 1324 | 1325 | 1492 | 1443 | 1493 | 1493 | 1492 | 1491 |
| FINAL PRODUCT INFORMATION: | | | | | | | | | | |
| Extruder Discharge Moisture | % wb | 20.43 | 19.79 | 20.4 | 21.32 | 21.46 | 21.97 | 22.12 | 22.83 | 22.71 |
| Extruder Discharge Density | kg/m³ | 312 | 374 | 338 | 400 | 349 | 352 | 336 | 336 | 400 |
| Extruder Performance | | Stable | Stable | Stable | Stable | Stable | Stable | Stable | Stable | Stable |
| Dried Product Moisture | % wb | 2.75 | 2.12 | 4.67 | 9.38 | 9.74 | 10.18 | 7.45 | 9.4 | 8.0 |

The dried samples were analyzed to determine ivermectin content, using the technique described in Example 1. The results from the Recipe #1, #2 and #3 runs were averaged, with the following results. For the Recipe #1 runs (101–103), the ivermectin content was 6.02 μ/kg (dry basis); for the Recipe #2 runs (104–106), the ivermectin content was 11.99 μ/kg (dry basis); and for the Recipe #3 runs (107–109), the ivermectin content was 35.98 μ/kg (dry basis). This confirms that the processing technique of this Example gives extremely close ivermectin contents, as compared with the pre-extrusion goals.

EXAMPLE 4

In this example, a series of extrusion runs were carried out with dog food products containing different active ingredients. The equipment employed was a Wenger laboratory-scale X-5 extruder. The actives used in the respective runs were: Methoprene (insect growth regulator, Run 002); Lufenuron (insect growth regulator, chemically dissimilar to Methoprene, Run 003); Praziquantel (tapeworm treatment, Run 004); Enrofloxacin (potent broad spectrum antibiotic, Run 005); Dexamethasone (steroid of the cortisone type, Run 006); Ibuprofen (non-steroidal anti-inflammatory drug, Run 007); Fenbendazole (mammal dewormer, Run 008); Oxytetracycline (widely used antibiotic, Run 009); Ivermectin, Methoprene, Praziquantal cocktail (antiparasitical combination, Run 010); Imidaccopria (imidacloprid, Run 011); Amoxicillin (broad spectrum antibiotic, Run 012); Tribrissen (antibiotic, Run 013); Doramectin (broad spectrum dewormer and anthelmintic, Run 014).

In particular, the recipes for each run are set forth in the following table:

TABLE 4

| Recipe-Run 001 | By Weight |
|---|---|
| Corn | 35.9281% |
| Poultry Meal | 28.9421% |
| Rice | 22.9541% |
| Corn Gluten Meal | 11.9760% |
| Lasi Pet Premix | 0.0998% |
| Trace Mineral #95 | 0.0998% |
| Total | 100.0000% |

*0.980 kg of water was added to the above mixture

| Recipe-Run 002 | By Weight |
|---|---|
| Corn | 35.7982% |
| Poultry Meal | 28.8374% |
| Rice | 22.8711% |
| Corn Gluten Meal | 11.9327% |
| Lasi Pet Premix | 0.0994% |
| Trace Mineral #95 | 0.0994% |
| Hartz Methoprene Capsule Content | 0.3618% |
| Total | 100.0000% |

*0.980 kg of water was added to the above mixture
Calculated Active content in batch = 0.0051 kg

| Recipe-Run 003 | By Weight |
|---|---|
| Corn | 35.7982% |
| Poultry Meal | 28.8374% |
| Rice | 22.8711% |
| Corn Gluten Meal | 11.9327% |
| Lasi Pet Premix | 0.0994% |
| Trace Mineral #95 | 0.0994% |
| Lufenuron-Novartis | .01571% |
| Total | 99.7954% |

TABLE 4-continued

*0.980 kg of water was added to the above mixture
Calculated Active content in batch = 0.0053 kg

| Recipe-Run 004 | By Weight |
|---|---|
| Corn | 35.2250% |
| Poultry Meal | 28.3757% |
| Rice | 22.5049% |
| Corn Gluten Meal | 11.7417% |
| Lasi Pet Premix | 0.0978% |
| Trace Mineral #95 | 0.0978% |
| Bayer Droncit (Praziquantel) | 1.0176% |
| Propylene Glycol | 0.1571% |
| Total | 100.0000% |

*0.880 kg of water was added to the above mixture
Calculated Active content in batch = 0.0028 kg

| Recipe-Run 005 | By Weight |
|---|---|
| Corn | 35.5731% |
| Poultry Meal | 28.6561% |
| Rice | 22.7273% |
| Corn Gluten Meal | 11.8577% |
| Lasi Pet Premix | 0.0988% |
| Trace Mineral #95 | 0.0988% |
| Bayer Baytril Injectable (Enfloxacin) | 0.9881% |
| Total | 100.0000% |

*0.930 kg of water was added to the above mixture
Calculated Active content in batch = 0.0050 kg

| Recipe-Run 006 | By Weight |
|---|---|
| Corn | 35.6679% |
| Poultry Meal | 26.3158% |
| Rice | 20.8711% |
| Corn Gluten Meal | 10.8893% |
| Lasi Pet Premix | 0.0907% |
| Trace Mineral #95 | 0.0907% |
| Dexamethasone Solution | 9.0744% |
| Total | 100.0000% |

*0.480 kg of water was added to the above mixture
Calculated Active content in batch = 0.0010 kg

| Recipe-Run 007 | By Weight |
|---|---|
| Corn | 35.8728% |
| Poultry Meal | 28.8975% |
| Rice | 22.9187% |
| Corn Gluten Meal | 11.9576% |
| Lasi Pet Premix | 0.0996% |
| Trace Mineral #95 | 0.0996% |
| Ibuprofen | 0.1541% |
| Total | 100.0000% |

*0.980 kg of water was added to the above mixture
Calculated Active content in batch = 0.0050 kg

| Recipe-Run 008 | By Weight |
|---|---|
| Corn | 35.5554% |
| Poultry Meal | 28.6419% |
| Rice | 22.7160% |
| Corn Gluten Meal | 11.8518% |
| Lasi Pet Premix | 0.0988% |
| Trace Mineral #95 | 0.0988% |
| Pavacur- Febendzole Paste | 01.0374% |
| Total | 100.0000% |

*0.980 kg of water was added to the above mixture
Calculated Active content in batch = 0.005052 kg

| Recipe-Run 009 | By Weight |
|---|---|
| Corn | 35.5731% |
| Poultry Meal | 28.6561% |
| Rice | 22.7273% |

TABLE 4-continued

| | |
|---|---|
| Corn Gluten Meal | 11.8577% |
| Lasi Pet Premix | 0.0988% |
| Trace Mineral #95 | 0.0988% |
| Maxim 200-Oxytetracycline Solution | 0.9881% |
| Total | 100.0000% |

*0.930 kg of water was added to the above mixture
Calculated Active content in batch = 0.0050 kg

| Recipe-Run 010 | By Weight |
|---|---|
| Corn | 35.4801% |
| Poultry Meal | 28.5812% |
| Rice | 22.6678% |
| Corn Gluten Meal | 11.8267% |
| Lasi Pet Premix | 0.0986% |
| Trace Mineral #95 | 0.0986% |
| Equvalan Paste-Ivermectin | 0.1344% |
| Hartz Methoprene Capsule Content | 0.1271% |
| Bayer Droncit (Praziquantel) | 0.9856% |
| Total | 100.0000% |

*0.980 kg of water was added to the above mixture
Calculated Ivermectin Active content in batch = 0.000114 kg
Calculated Methoprene Active content in batch = 0.005082 kg
Calculated Praziquantel Active content in batch = 0.00284 kg

| Recipe-Run 011 | By Weight |
|---|---|
| Corn | 35.7001% |
| Poultry Meal | 28.7584% |
| Rice | 22.8084% |
| Corn Gluten Meal | 11.9000% |
| Lasi Pet Premix | 0.0992% |
| Trace Mineral #95 | 0.0992% |
| Bayer Advantage-Imidacloprid | 0.6347% |
| Total | 100.0000% |

*0.948 kg of water was added to the above mixture
Calculated Active content in batch = 0.002912 kg

| Recipe-Run 012 | By Weight |
|---|---|
| Corn | 35.8905% |
| Poultry Meal | 28.9118% |
| Rice | 22.9300% |
| Corn Gluten Meal | 11.9635% |
| Lasi Pet Premix | 0.0997% |
| Trace Mineral #95 | 0.0997% |
| Amoxicillin-Antibiotic | 0.1049% |
| Total | 100.0000% |

*0.980 kg of water was added to the above mixture
Calculated Active content in batch = 0.005 kg

| Recipe-Run 013 | By Weight |
|---|---|
| Corn | 35.8802% |
| Poultry Meal | 28.9035% |
| Rice | 22.9234% |
| Corn Gluten Meal | 11.9601% |
| Lasi Pet Premix | 0.0997% |
| Trace Mineral #95 | 0.0997% |
| Tribrissen-Antibiotic | 0.1336% |
| Total | 100.0000% |

*0.980 kg of water was added to the above mixture
Calculated Active content in batch = 0.00576 kg

| Recipe-Run 014 | By Weight |
|---|---|
| Corn | 35.8566% |
| Poultry Meal | 28.8845% |
| Rice | 22.9084% |
| Corn Gluten Meal | 11.9522% |
| Lasi Pet Premix | 0.0996% |

TABLE 4-continued

| | |
|---|---|
| Trace Mineral #95 | 0.0996% |
| Doramectin (Dectomax) | 0.1992 |
| Total | 100.0000% |

*0.970 kg of water was added to the above mixture
Calculated Active content in batch = 0.0001 kg The X-5 extruder included seven interconnected heads with a single extruder shaft supporting rotating elements. The X-5 was also equipped with a Wenger die/adaptor. The extrudates were manually cut upon emerging from the die and were dried in a laboratory drier to a moisture content less than 10% by weight.

In each run the active ingredient(s) were diluted into a miscible liquid (water or propylene glycol) and combined with 0.5 kg of the recipe to make a premix. This premix was then loaded into a Hobart mixer along with the remaining contents of the batch (total of 5 kg in each case) and mixed to obtain the final recipe for extrusion. The individual batches were loaded into the feeding bin and the extrusion runs were started. Samples were taken at regular intervals of approximately 5 minutes after stable conditions were achieved. Some samples were taken "as is" from the extruder without drying and were frozen. Other dried samples were bagged and maintained at ambient temperature.

We claim:

1. A daily ration animal feed comprising an extrusion-cooked extruded feed product containing respective quantities of protein, fat, and starch, said extruded feed product having up to about 1500 μg/kg feed of at least one active substantially uniformly dispersed therein and effective for continuously maintaining in the bloodstream of the animal consuming the feed on a daily basis a therapeutic amount of said active.

2. The feed of claim 1, said active selected from the group consisting of antibiotics, steroids, anti-inflammatory agents, endoctocides, ectoparasiticides and mixtures thereof.

3. The feed of claim 1, said active being present in the extruded product feed at a level of at least about 2 μg active/kg of the extruded product feed.

4. The feed of claim 3, said level being from about 2–1500 μg active/kg feed.

5. The feed of claim 1, said drug being substantially uniformly dispersed throughout the feed.

6. The feed of claim 1, said extruded feed product selected from the group consisting of dry and semi-moist extruded feed products.

7. The feed of claim 1, said active being present at a level so that, when an animal consumes the feed at a daily rate of from about 10–40 g feed per kg of the animal's weight, a therapeutically effective amount of the active is established and maintained in the animal's bloodstream.

8. A method of feeding an animal comprising the steps of feeding the animal on a daily basis an extrusion-cooked daily ration containing up to about 1500 μg/kg feed of an active substantially uniformly dispersed therein, said active present in the ration so that a therapeutically effective amount of the active is established and maintained in the animal's bloodstream.

9. The method of claim 8, said active being selected from the group consisting of antibiotics, steroids, anti-inflammatory agents, endoctocides, ectoparasiticides and mixtures thereof.

10. The method of claim 8, said active being present in said feed at a level of at least about 2 μg active/kg of feed.

11. The method of claim 10, said level being from about 2–1500 μg active/kg feed.

12. The method of claim 9, said active being substantially uniformly dispersed throughout the feed.

13. The method of claim 9, said feed being an extruded feed product containing respective quantities of protein, fat and starch.

14. The method of claim 13, said extruded feed product selected from the group consisting of dry and semi-moist extruded feed products.

15. The method of claim 9, said active being present at a level so that, when the animal consumes the feed at a daily rate of from about 10–40 g feed per kg of the animal's weight, a therapeutically effective amount of the active is established and maintained in the animal's bloodstream.

16. A daily ration animal feed comprising an extrusion-cooked extruded feed product containing respective quantities of protein, fat, and starch, said extruded feed product having at least one drug co-extruded therein and being effective for continuously maintaining in the bloodstream of the animal consuming the feed on a daily basis a therapeutic amount of the drug.

17. A method of feeding an animal comprising the steps of feeding the animal on a daily basis an extrusion-cooked daily ration containing a drug, said drug being co-extruded with the ration and present in the ration so that a therapeutically effective amount of the drug is established and maintained in the animal's bloodstream.

* * * * *